United States Patent
Wolf

(10) Patent No.: US 10,150,628 B2
(45) Date of Patent: Dec. 11, 2018

(54) CONTAINER FILLING PLANT FOR HANDLING DIFFERENT CONTAINERS, AND A METHOD OF OPERATING A CONTAINER FILLING PLANT FOR HANDLING DIFFERENT CONTAINERS

(71) Applicant: Uwe Wolf, Ruedesheim (DE)

(72) Inventor: Uwe Wolf, Ruedesheim (DE)

(73) Assignee: KHS GmbH, Dortmund (DE)

( * ) Notice: Subject to any disclaimer, the term of this patent is extended or adjusted under 35 U.S.C. 154(b) by 700 days.

(21) Appl. No.: 14/663,880

(22) Filed: Mar. 20, 2015

(65) Prior Publication Data

US 2015/0307287 A1    Oct. 29, 2015

Related U.S. Application Data

(63) Continuation-in-part of application No. PCT/EP2013/002553, filed on Aug. 24, 2013.

(30) Foreign Application Priority Data

Sep. 21, 2012    (DE) .................. 10 2012 108 953

(51) Int. Cl.
  *B65G 47/84*    (2006.01)
  *B65C 9/00*    (2006.01)
  (Continued)

(52) U.S. Cl.
  CPC .............. *B65G 47/846* (2013.01); *B65B 3/04* (2013.01); *B65B 55/24* (2013.01); *B65B 61/025* (2013.01);
  (Continued)

(58) Field of Classification Search
  CPC .... F16B 21/165; F16B 5/0642; F16B 5/0657; B65G 47/846
  See application file for complete search history.

(56) References Cited

U.S. PATENT DOCUMENTS 3,507,528 A    4/1970    Desmarchais
3,596,554 A    8/1971    Othman et al.
(Continued)

FOREIGN PATENT DOCUMENTS

DE    44 36 201    4/1996
DE    29617148    10/1997
(Continued)

OTHER PUBLICATIONS

International Search Report PCT/EP2013/002553 dated Dec. 12, 2013, and English translation thereof.

*Primary Examiner* — Jonathan P Masinick
(74) *Attorney, Agent, or Firm* — Nils H. Ljungman & Associates

(57) ABSTRACT

A container filling plant for handling different containers, and a method of operating a container filling plant for handling different containers. The abstract of the disclosure is submitted herewith as required by 37 C.F.R. § 1.72(b). As stated in 37 C.F.R. § 1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 9 Drawing Sheets

(51) Int. Cl.
  *B67C 3/22* (2006.01)
  *B65B 3/04* (2006.01)
  *B65B 55/24* (2006.01)
  *B65B 61/02* (2006.01)
  *B65C 3/08* (2006.01)
  *B67B 6/00* (2009.01)
  *B67C 3/26* (2006.01)
  *F16B 21/16* (2006.01)

(52) U.S. Cl.
  CPC ............... *B65C 3/08* (2013.01); *B65C 9/00* (2013.01); *B67B 6/00* (2013.01); *B67C 3/22* (2013.01); *B67C 2003/2668* (2013.01); *F16B 21/165* (2013.01)

(56) References Cited

U.S. PATENT DOCUMENTS

| | | | | |
|---|---|---|---|---|
| 3,704,486 A * | 12/1972 | Blacklock | F16B 5/0642 | 174/138 D |
| 4,114,339 A * | 9/1978 | Ito | F16B 5/065 | 24/618 |
| 4,973,212 A * | 11/1990 | Jacobs | F16B 5/0642 | 24/297 |
| 5,061,112 A * | 10/1991 | Monford, Jr. | F16B 21/165 | 292/251.5 |
| 5,340,255 A * | 8/1994 | Duran | F16B 21/165 | 411/348 |
| 5,452,979 A * | 9/1995 | Cosenza | B60R 21/2035 | 411/348 |
| 5,494,323 A * | 2/1996 | Huang | E05B 63/121 | 24/453 |
| 6,336,766 B1 * | 1/2002 | De Villele | B65G 47/846 | 403/13 |
| 6,390,722 B1 * | 5/2002 | Godfrey | F16B 21/165 | 294/82.28 |
| 7,007,793 B2 * | 3/2006 | Stocchi | B65G 29/00 | 198/473.1 |
| 7,340,808 B2 * | 3/2008 | Baekelandt | B60R 13/0206 | 24/453 |
| 7,401,387 B2 * | 7/2008 | Rosemann | F16B 5/065 | 24/289 |
| 7,547,061 B2 * | 6/2009 | Horimatsu | B60R 13/0206 | 296/187.01 |
| 7,654,027 B1 * | 2/2010 | Grover | F16B 21/165 | 24/573.11 |
| 7,762,739 B2 * | 7/2010 | Blanchard | A01B 33/028 | 403/322.2 |
| 8,251,606 B2 * | 8/2012 | Blanchard | A01B 33/028 | 294/57 |
| 8,534,658 B2 * | 9/2013 | Schron, Sr. | F16B 21/165 | 269/289 R |
| 9,650,210 B2 * | 5/2017 | Wolf | B65G 21/2072 | |
| 2002/0021005 A1 * | 2/2002 | Giovanni | B67C 7/0006 | 285/145.3 |
| 2003/0170071 A1 | 9/2003 | Tsui et al. | | |
| 2008/0276668 A1 * | 11/2008 | Stachowiak, Jr. | E05B 65/0089 | 70/164 |
| 2010/0200373 A1 | 8/2010 | McAlister et al. | | |

FOREIGN PATENT DOCUMENTS

| | | | | |
|---|---|---|---|---|
| DE | 10 2004 056858 | | 6/2006 | |
| DE | 102009018739 | | 9/2010 | |
| DE | 10 2009 018731 | | 10/2010 | |
| EP | 2 213 579 | | 8/2010 | |
| EP | 2713061 A1 * | 4/2014 | ............ F16B 21/165 | |
| GB | 2 347 171 | | 8/2000 | |
| WO | WO 2010/127700 | | 11/2010 | |

\* cited by examiner

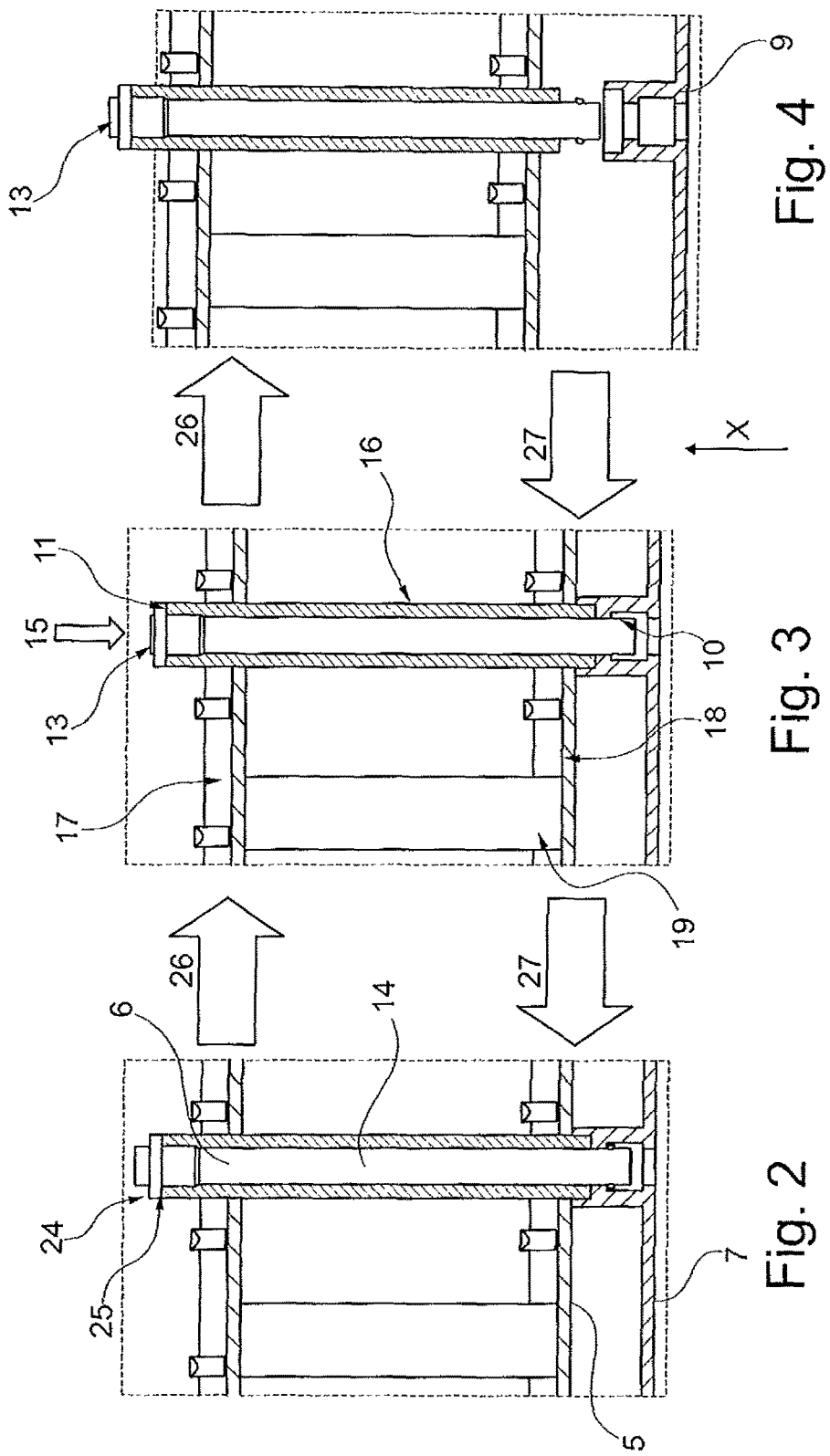

CONTAINER FILLING PLANT FOR HANDLING DIFFERENT CONTAINERS, AND A METHOD OF OPERATING A CONTAINER FILLING PLANT FOR HANDLING DIFFERENT CONTAINERS

CONTINUING APPLICATION DATA

This application is a Continuation-In-Part application of International Patent Application No. PCT/EP2013/002553, filed on Aug. 24, 2013, which claims priority from Federal Republic of Germany Patent Application No. 10 2012 108 953.1, filed on Sep. 21, 2012. International Patent Application No. PCT/EP2013/002553 was pending as of the filing date of this application. The U.S. was an elected state in International Patent Application No. PCT/EP2013/002553.

BACKGROUND

1. Technical Field

The present application relates to a container filling plant for handling different containers, and a method of operating a container filling plant for handling different containers.

2. Background Information

Background information is for informational purposes only and does not necessarily admit that subsequently mentioned information and publications are prior art.

The present application concerns a container processing plant or a format part which can be connected to a receiving element via at least one connecting element.

Such format parts can be used for example in bottle processing machines. Such a format part is a bottle-dependent component of the bottle processing machine which can be changed suitably for one or more bottles. Bottle processing machines can be fillers, closers, labelers or similar which for example transport rotating bottles.

The format parts are designed so they are adapted to specific bottle diameters and heights. The connecting elements are connected firstly to a receiving element and secondly to the format part. For this, normally, a screw connection is provided which means that the elements spaced from each other are joined together by form fit via the connecting elements.

A bottle processing machine can process several bottles which have different heights or different diameters e.g. in their body region. Evidently the bottle processing machines normally process bottle series with the same dimensions. On a change to a new bottle series with said different dimensions, the format parts must or should be adapted to the new dimensions. This is normally achieved by exchanging the respective format parts.

These are however, as described above, connected by form fit, i.e., screwed to the receiving element via the connecting elements. To change these therefore, the respective screw connections must or should be released, for which at present a tool is required or desired. Releasing each of the individual screw connections is very time-intensive and therefore has a negative effect on the availability of the bottle processing machine. Also, the existing format part must or should be replaced by a format part adapted to the new dimensions of the bottle series, so that, again, considerable time is required or desired for creating the screw connections. To this extent considerable time is required or desired for conversion, which not only entails huge personnel costs, but also shuts down the bottle processing machine so that production, e.g. filling or labeling, and upstream or downstream steps are interrupted.

In order to remove or install the format part to be changed, parameters which must or should be observed precisely or substantially precisely must or should be executed, which means that there is a high potential for error. The downside however is that the container or bottle quasi-locks the format part so that the format part cannot be removed if the bottles are not guided correctly (crashed), since the format part can be removed in the radial direction i.e. transverse to the vertical axis of the bottle processing machine.

Some so-called quick release pins are known.

Some guide elements comprise guide part elements, which can be connected together at least via one connecting element.

The at least one connecting element has a first connecting part element and a second connecting part element, wherein the one connecting part element has a lockable socket in which the other connecting part element can be inserted with its plug side which is designed corresponding to the socket, so that the one connecting part element is securely held in position by force fit on the other connecting part element when the lockable socket is locked. Thus a guide element is provided, the guide part elements of which, i.e. the neck guide element and the interchangeable star plate, are connected together by a plug-in connection of the two connecting part elements, wherein the positional security is created by force fit by means of the lockable socket. In contrast to the prior art described above, to change, for example, the interchangeable star plate, it may be necessary or desired to unlock the lockable socket so that the connecting part element inserted in the socket can simply be withdrawn from the socket. Also the lockable socket can be actuated without tools. If the lockable socket has seized, a release aid or impact aid may be required to support the release. However, usually only a few impacts are required to support the release, whereby the change cost or release cost of the connecting part elements connected together by force fit may not be affected negatively. In principle the lockable socket can possibly be actuated manually without tools.

OBJECT OR OBJECTS

The present application is based on an object of specifying a container processing plant of the type cited initially, the format part of which can be changed in an even more simple, time-saving manner without tools, wherein the connecting element concerned is improved with regard to hygienic requirements.

SUMMARY

According to the present application, the object is achieved by a container processing plant, wherein the connecting element is designed as a locking pin, and wherein a latching element is provided on the receiving element, wherein the connecting element reaches through the format part, and wherein the connecting element can be separably connected by its connection end to the latching element, and wherein the format part can be fitted and removed parallel or substantially parallel to the vertical axis of the container processing plant.

In a possible embodiment, the locking pin has its connection end and an actuation end lying opposite this. Locking elements are arranged on the connection end, in the possible embodiment as locking balls or locking bolts, wherein an actuating element is arranged on the actuation end. The connecting element can consequently also be called a ball locking pin or also a locking pin. Between the actuating end and the connection end, a hollow body is arranged through which an actuating mechanism extends for locking and unlocking the locking balls or locking bolt. In a possible embodiment, the connecting element can be formed from stainless steel.

In a possible embodiment, the actuating element is designed as a pushbutton. When the pushbutton is actuated, the locking balls or bolts are released. The push button is released again to lock the locking balls or bolt.

In order for the connecting element to reach through the format part, in a suitable embodiment at least one through bore is provided on the format part.

It is suitable if the connecting element, in the embodiment as a ball locking pin or locking pin, reaches through the format part to be changed, wherein a hollow body can be provided through which the ball locking pin can extend. The hollow body can be arranged between the components of the format part, wherein an upper component can be adapted, for example, to the dimensions of a bottle neck, and wherein a lower component can be adapted, for example, to the dimensions of a bottle body. The hollow body can however also be designed such that it reaches through both components. In the possible embodiment, the hollow body is formed as a hollow cylinder of stainless steel and can assume the function of a spacer element for the two components and also the function of a protective tube for the connecting element. Naturally separate spacer elements can also be provided. By means of the hollow body but also by means of the spacer elements, the format part can be pre-assembled with its two components so that it may be necessary or desired to guide the connecting element through the hollow body in the direction of the receiving element. Such an embodiment is useful also because this avoids, restricts, or minimizes a specific sequence for removing and fitting several components, wherein the pre-assembly can be performed outside the container processing plant. This is possible with regard to the constricted space available within the container processing plant.

In a suitable embodiment, the latching element is designed as a sleeve in the manner of a hollow cylinder with a latching edge arranged at the top, wherein the latching edge extends radially in the direction towards a center point so that a passage opening is formed for the connection end of the ball locking pin. In a possible embodiment, the latching edge can be offset downward so that an upwardly oriented stop is formed on which the lower free end of the hollow body can rest, wherein the outer periphery of the hollow body can lie on the inner periphery of the latching element. The stop can also be regarded as a travel limit at which the free end of the hollow body, through which the connecting element extends, stops perceptibly i.e. audibly, so that the operator can be certain of an adequate insertion depth. In this position the pushbutton can be released, so that the locking elements can engage behind the latching edge and rest there positionally securely.

To connect the format part with the container processing plant, the ball locking pin is simply unlocked, wherein the pushbutton is held down. The connection end is introduced into the latching element, wherein then the pushbutton is released so that the locking balls or bolts lock i.e. lie behind the latching edge.

On its actuation end, the connecting element has a flange extension with which the ball locking pin can be laid on the surface of the format part so as to form a quasi-abutment for the connecting element. The connecting element is thus held under pretension so that the format part is mounted positionally securely on the container processing plant.

Naturally several connecting elements can be provided.

Using the present application, the format part can be changed i.e. removed and fitted without tools in a time-saving manner, since the connecting elements i.e. the ball locking pins, need be or should be actuated. Thus there is no need or desire for a time-consuming screw connection. Also the format part can be inserted pre-assembled, which also saves time. Furthermore the format part can be fitted or removed parallel or substantially parallel to the vertical axis of a container processing plant i.e. in the vertical direction. This is possible in the event of a crash since the format part can thus easily be removed while oriented upward, so that the crash cause can easily be eliminated. For example, if a container, such as a plastic bottle, were to become jammed in the machine components or format parts, such as a star wheel plate, the format part can be lifted up along its rotational axis. Such a removal could be advantageous since often an upper portion of a format part projects radially outward further than a lower portion because the upper portion is sized to guide a neck portion of a bottle, while the lower portion is smaller-sized to accommodate and guide the thicker body portion of the bottle. By removing the format part in a vertical direction, the format part can be easily lifted away from the jammed bottle. The format part can comprise several segments so that in the event of a crash, where applicable the segment component concerned need or should be fitted or removed. Also on a complete change of format part, the segment construction is possible since in this way, handling of the individual segments is easier to achieve. For hygiene reasons, the connecting element is housed completely in the hollow body, wherein both elements but also the latching elements are made of stainless steel. The locking pins are used for rapid fixing, blocking, adjusting, changing and securing of the format part. It is possible that the locking pins can be released quickly and easily for frequently repeated connections (press=unlock). The respective locking pin is extremely strong since it is made of high strength, hardened and wear-resistant material. The shear strength depends on the material, component size and number of balls. The shear strength is based on around sixty percent of the limit value of the tensile strength of the material.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Further possible embodiments of the present application are disclosed herein and in the following description of the figures. These show:

FIG. 2 an extract of a format part in detail which is connected to the container processing plant by means of a connecting element;

FIG. 3 the extract from FIG. 2 in which the connecting element is actuated;

FIG. 4 the extract from FIG. 2 in which the connecting element is separated from the latching element;

DESCRIPTION OF EMBODIMENT OR EMBODIMENTS

Figure 1:
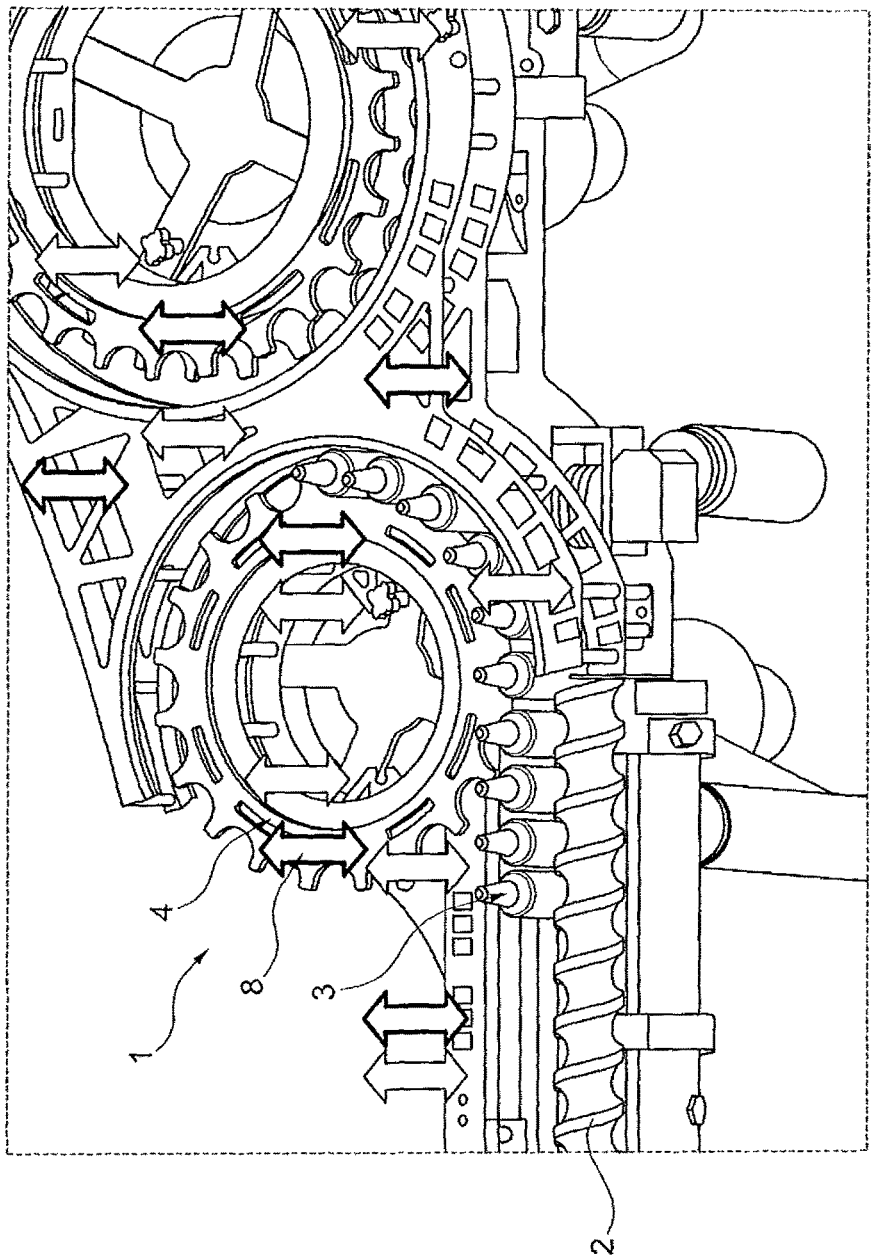
FIG. 1 an extract from a container processing plant in perspective view.

In the various figures, the same parts carry the same reference numerals so these are normally described once.

FIG. 1 shows a container processing plant 1 with a worm conveyor 2 with which containers 3, e.g. bottles, are transported to a transport star 4. Such container processing plants are generally known so are not described in more detail here.

The container processing plant 1 has at least one format part 5 (FIGS. 2 to 4) which can be connected to a receiving element 7 via at least one connecting element 6. The format parts 5 are designed for different container dimensions, for which reason they are fitted and removed on a change of container series. This is indicated in FIG. 1 by means of the arrows 8, wherein it is evident that the format parts 5 can be fitted and removed parallel or substantially parallel to a vertical axis X of the container processing plant, i.e. in the vertical direction.

The connecting element 6 is formed as a locking pin 6, in one possible embodiment as a ball locking pin 6, wherein a latching element 9 is provided on the receiving element 7, wherein the connecting element 6 reaches through the format part 5, and wherein the connecting element 6 can be separably connected with its connection end 10 to the latching element 9, and wherein the format part 5 can be fitted and removed parallel or substantially parallel to the vertical axis X of the container processing plant 1.

In a possible embodiment, the ball locking pin 6 has its connection end 10 and an actuating end 11 lying opposite this. Locking elements 12 are arranged at the connection end 10, in the possible embodiment in the form of locking balls 12 (FIG. 5), wherein an actuating element 13 is arranged on the actuating end 11. A hollow body 14 is arranged between the actuating end 11 and the connection end 10, through which an actuating mechanism extends for locking and releasing the locking balls 12.

Figure 5:
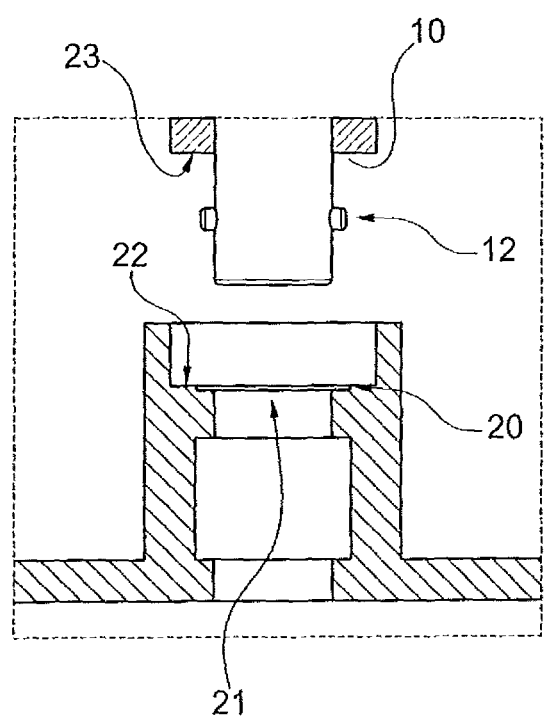
FIG. 5 an enlarged extract from FIG. 4 with the latching element and the connection end, and FIG. 6 an enlarged extract from FIG. 2 with the latching element and connection end.
Figure 6:
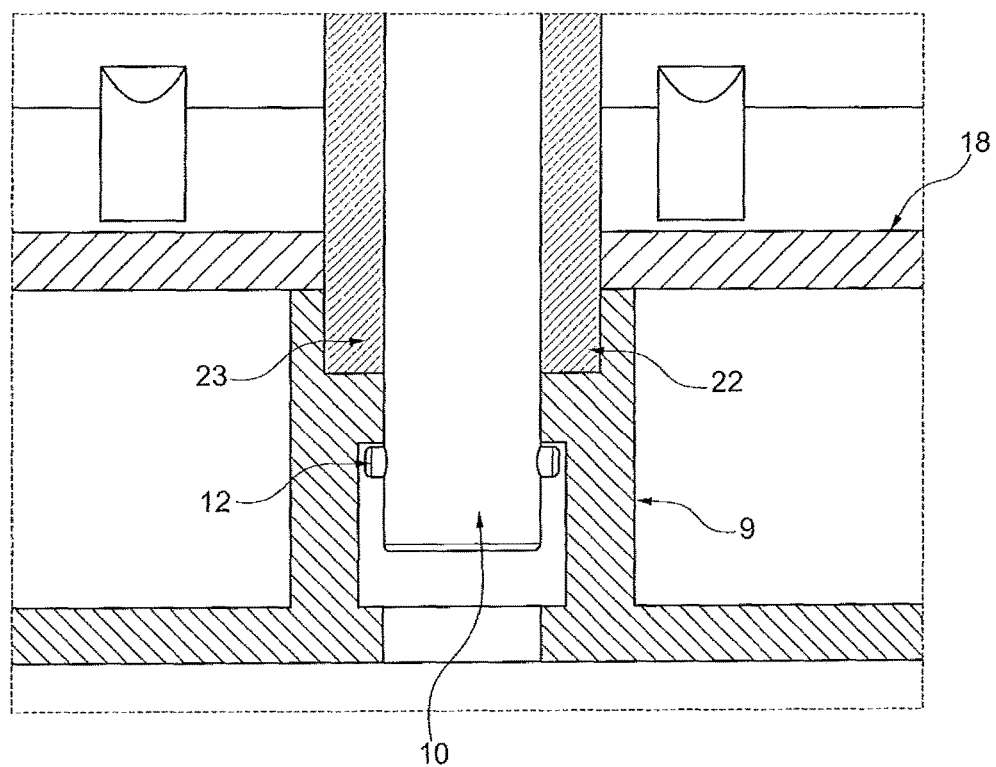
Figure 7:
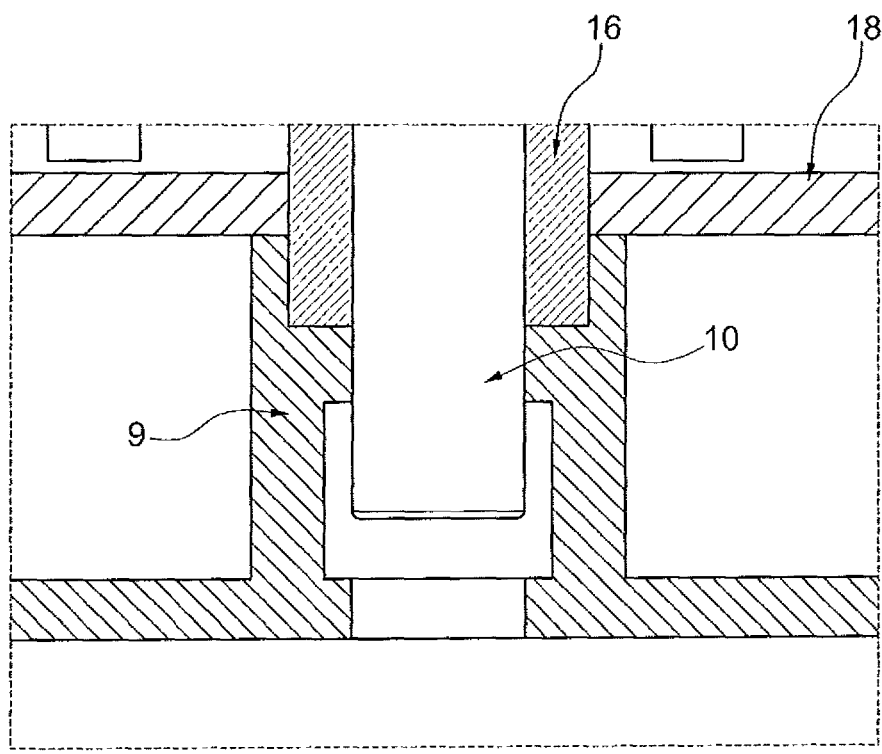
FIG. 7 an enlarged extract from FIG. 3 with the latching element and connection end.

As evident in FIG. 3, the actuating element 13 is designed as a pushbutton. When the pushbutton is actuated, the locking balls 12 are unlocked (FIG. 7). Actuation of the actuating element 13 is indicated by the arrow 15. When the pushbutton is released again, the locking balls 12 are locked (FIGS. 5 and 6). As soon as the locking balls 12 are unlocked, the ball locking pin 6 can be lifted from the latching element 9 (FIG. 5) since the locking balls 12 have been brought out of their locking position and held there by pressing down the pushbutton. So the format part 5 can be separated from the container processing machine, as evident in FIG. 4 and indicated in FIG. 5.

It is evident from FIGS. 2 to 4 that the connecting element 6 in the form of a ball locking pin reaches through the format part 5 to be changed, wherein a further hollow body 16 is provided through which the ball locking pin 6 extends. The hollow body 16 overlaps the component 17, 18 of the format part 5, wherein an upper component 17 is adapted e.g. to the dimensions of a bottle neck, and wherein a lower component 18 can be adapted e.g. to the dimensions of a bottle body.

In the drawing plane, at the left-hand edge of the respective FIGS. 2 to 4, a separate spacer element 19 is shown. By means of the hollow body 16 and/or also by means of the spacer elements 19, the format part 5 can be pre-assembled with its two components 17, 18 so that for final assembly it may be necessary or desired to guide the connecting element 6 through the hollow body 16 in the direction towards the receiving element 7, in order for it to engage with the latching element 9.

Figure 10:
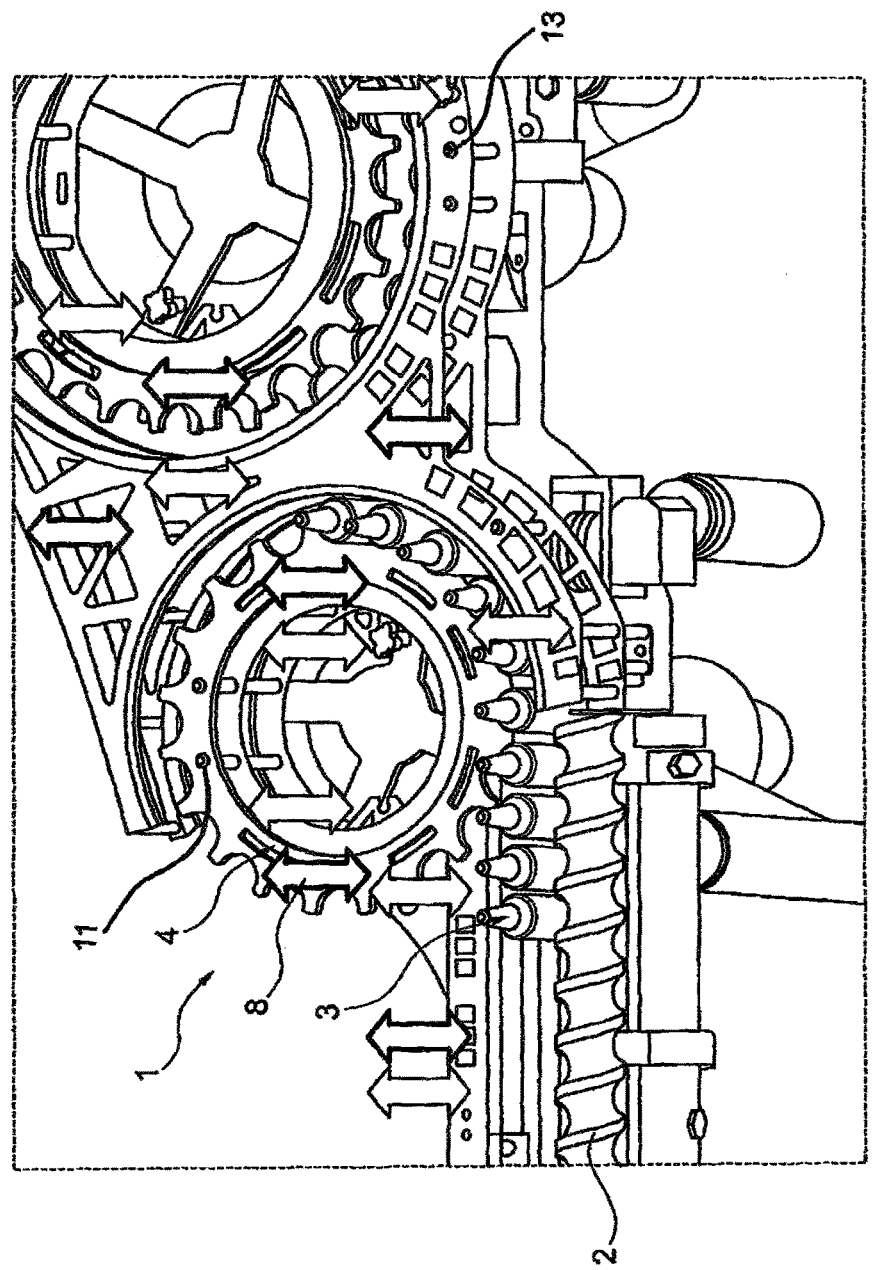
FIG. 10 shows the extract from a container processing plant in perspective view, as shown in FIG. 1, with additional components according to at least one possible embodiment of the present application.

FIG. 10 shows, for purposes of example, possible installations of the hollow body 16 between the two components 17, 18 of the format part 5. In the example shown in FIG. 10, the format part 5 is a star wheel or star plate, or is a guide frame or guide part that at least partially surrounds a star wheel. Each of these format parts comprises the upper component 17 and the lower component 18. These components 17, 18 are connected by the hollow body 16 and/or the spacer element 19. At the upper surface of these format parts 5, the actuating end 11 of the locking pin 6 can be seen. The actuating end 11 includes the actuating element 13, such as a pushbutton. A few of these actuating ends 11 are shown at various locations on the format parts 5, both on the star wheel and the guide frame. The embodiment shown in FIG. 10 is for purposes of example to show where a locking pin 6 could possibly be installed in a portion of a container or bottle processing machine or plant. Depending on the desired installation design, a plurality of locking pins 6 and their related components could be utilized for the installation of format parts 5. Virtually any number of the locking pins 6 could be located at various positions on the format part 5 as desired. For example, in one possible embodiment, three or four or more locking pins 6 could be spaced at equidistant or substantially equidistant intervals, or possibly in pairs or groups at such intervals, about the circumference of a star wheel. To install or disconnect the star wheel, two or more workers could depress the pushbuttons 13 and work together to install or remove the star wheel. Similar installation and removal could be performed for a guide frame. Again, the embodiment shown in FIG. 10 is for exemplary purposes and should not be construed as limiting any of the embodiments described herein or shown in the other figures.

The latching element 9 is designed as a sleeve in the manner of a hollow cylinder with a latching edge 20 arranged at the top, wherein the latching edge 20 extends radially in the direction towards the center point so that a passage opening 21 is formed for the connection end 10 of the ball locking pin 6. As most clearly evident on FIGS. 4 and 5 to 7, the latching edge 20 is offset downward so that an upwardly oriented stop 22 is formed on which the lower free end 23 of the hollow body 16 can rest, wherein the outer periphery of the hollow body 16 can lie on the inner periphery of the catch edge 9, as shown for example in FIG. 2 but also in FIGS. 6 and 7.

At its actuating end 11, the connecting element 6 has a flange extension 4 with which the ball locking pin 6 can be laid on the surface of the format part 5, to form a quasi-abutment for the ball locking pin 6. In FIGS. 2 to 4, the flange extension is laid as an example on the upper free end 25 of the hollow body 16, wherein the hollow body 16 is suitably established in the passage openings of the components 17 and 18 concerned. The hollow body 16 with its free ends 23 and 25 overlaps firstly over the associated lower component 18 and also over the associated upper component 17.

FIG. 6, which shows the lower image extract from FIG. 2, clearly shows that the locking elements 12 engage under the latching edge 20, wherein the lower free end 23 of the hollow body 16 lies on the stop 22. The flange extension is fixed at the upper free end 25 so that the format part 5 is fitted with sufficient positional security corresponding to the operating conditions of the container processing plant 1.

In FIGS. 2 to 4, arrows 26 oriented towards the respective right-hand edge of the sheet point to the individual steps for removing the format part 5. Similarly the arrows 27 with opposite orientation point to the individual steps for fitting the format part.

Figure 8:
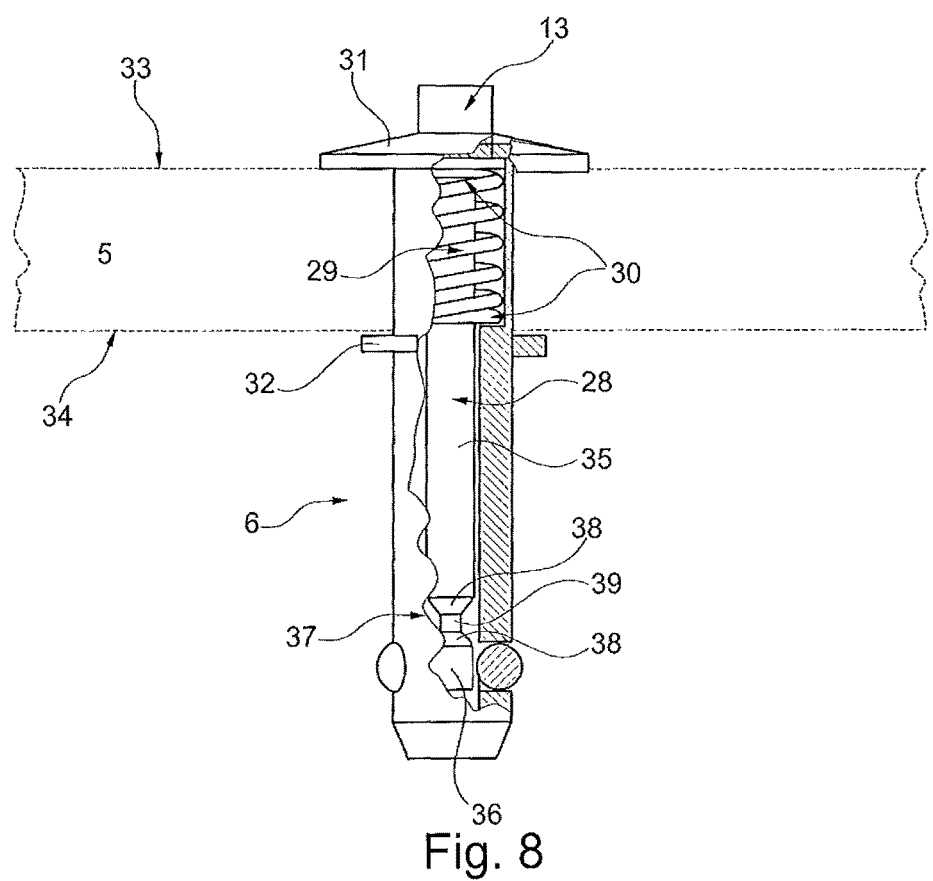
FIG. 8 shows a detailed view of a connecting element.

FIG. 8 shows in detail the connecting element 6, in the possible embodiment as a ball locking pin 6. The connecting element 6 has the connection end 10 and the opposing actuating end 6. An actuating mechanism 28 is arranged in the hollow body 14.

The actuating mechanism 28 on the actuating end has pushbutton 13 which acts on a spring 29 or a spring-loaded tappet 35. In the example shown, the spring 29 is held in a spring seat 30 on both the head end and the foot end, wherein the hollow body 14 on the actuating end is tapered in its wall thickness in order to form the respective spring seat 30 in the manner of a protrusion and the receiving chamber for the spring 29.

It is evident that the connecting element 6 is held at the actuating end positionally securely on the format part 5, wherein the format part 5 in the possible embodiment in FIG. 8 is designed of one piece with no upper or lower component. As an example the connecting element 6 has a contact element 31 and a contact flange 32. The contact element 31 is arranged on the pushbutton end and lies on a top 33 of the format part 5. Opposite this, the contact flange 32 is provided on a bottom 34. The contact element 31 can for example be screwed or otherwise connected to the hollow body 14, so that the connecting element 6 can first be pushed from the bottom 34 through the corresponding opening in the format part 5 until the contact flange 32 lies on the bottom 34, so that the connecting element 6 is held positionally securely by connection of the contact element 31 with the hollow body 14.

The actuating mechanism 28 furthermore has a tappet 35 which, when actuated by the pushbutton 13, acts on an active element 36 arranged on the connection end. The active element 36 is in direct active connection with the locking balls 12. Between the tappet 35 and the active element 36, a blocking element 37 is provided which has two opposingly conically designed regions 38 and an intermediate element 39. The conical regions 38 each taper to the diameter of the intermediate element 39.

If the pushbutton 13 is actuated, the tappet 35 is pushed in the direction of the connection end 10 and acts on the actuating element 36 which is moved from its neutral position, in which the locking balls 12 are free, into its fixed position where it is held. In this fixed position, the locking balls 12 are pressed out of the hollow body and fixed without movement in their radial direction, so that the connecting element 6, i.e. the ball locking pin 6, is fixed by contact of the locking balls under the latching edge 20 (FIG. 6). A second actuation of the pushbutton 13 returns the active element 36 to its neutral position, so that the locking balls 12 are free in the radial direction of the hollow body 14 so that the connecting element can be removed from the latching element 9, in that the locking balls 12 can escape towards the inside into the hollow body 14 (FIG. 7). Secondly, the connecting element can be inserted in the latching element 9 when the locking balls 12 are released.

Figure 9:
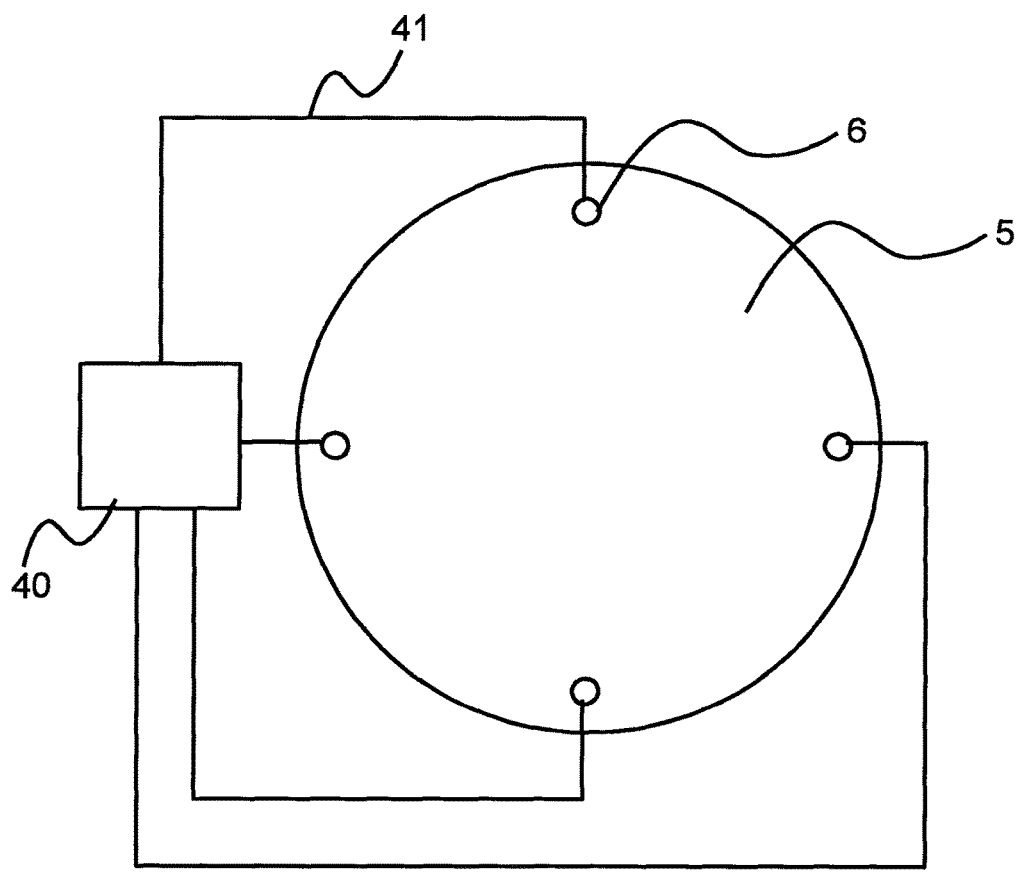
FIG. 9 shows a diagram of a pneumatic actuation system.

To prevent, restrict, or minimize tilting of the format part on insertion or release, in an improved embodiment of said connecting elements, it is provided that, instead of the pushbutton 13 or for several or all or substantially all pushbuttons 13 of a format part 5, a compressed air supply 40 and lines 41 are provided, as shown in the diagram in FIG. 9. Thus the upper part of the connecting element 6 is designed as a pressure chamber in which the upper stop plate (similar to spring plate 30) of the compression spring 29 is mounted axially displaceably, and where applicable sealed accordingly. Comparable moveable cylinders actively cooperating with the tappet 35 are conceivable.

By means of a central actuating valve or several decentral actuating valves, thus an individual connecting element can be pneumatically released or this can be performed simultaneously or substantially simultaneously for a group or all or substantially all connecting elements. For example the actuating valves can be arranged on the format part itself so that the operator, on releasing the format part, can hold these or remove and insert them directly.

In at least one possible embodiment of the present application, the high pressure lines 41 are not connected permanently or substantially permanently to the format part or one or the connecting elements or said actuating valves, but can be connected therewith as required or desired via a fast coupling with a pressure line e.g. by means of a pressure hose.

It is assumed above that one or more connecting elements are an integral component of a format part. The same also applies to above-mentioned embodiment variants, so that the connecting elements described naturally can firstly also be part of the format parts or can form a constructional unit with the receiving elements. In the latter case, compared with said embodiments, similarly the arrangement, position and orientation of the receiving element and connecting element can be changed.

Figure 11:
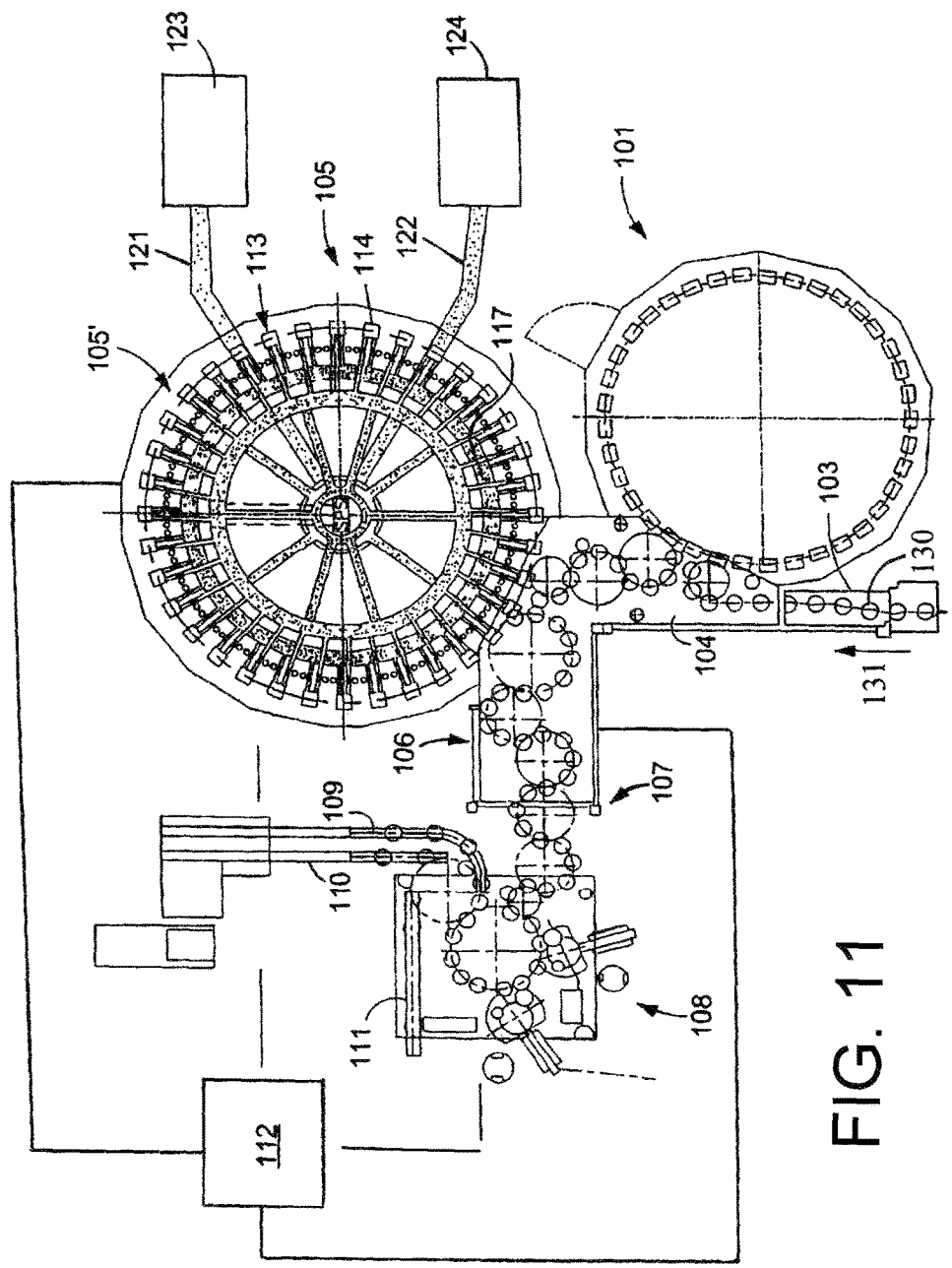
FIG. 11 shows schematically the main components of one possible embodiment example of a container filling or bottling plant.

It should be understood that a format part, as discussed herein, may refer to several different components of a container filling plant or bottling plant. A format part could be a star wheel or star wheel plate, or a guide frame or portion thereof, or other such structures that can or should be removed for repair or when the plant is to be modified to handle containers or bottles of different dimensions. In addition, a container filling plant or bottling plant can comprise several different machines, such as, but not limited to, container cleaning or rinsing machines, filling machines for filling a container with a product, such as a liquid, closing machines for applying closures to a filled container, labeling or printing machines for labeling or printing on containers, and packaging machines for packaging groups of containers. An example of a container filling plant is shown in FIG. 11. FIG. 11 shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 11 shows a rinsing arrangement or rinsing station 101, to which the containers, namely bottles 130, are fed in the direction of travel as indicated by the arrow 131, by a first conveyer arrangement 103, which can be a linear conveyer or a combination of a linear conveyer and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 11, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyer arrangement may be formed, for example, by a plurality of starwheels, or may also include a linear conveyer device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

The following patents, patent documents, and patent publications are hereby incorporated by reference, except for the exceptions indicated herein: U.S. Pat. No. 6,786,669 B2, having the title "Positive lock quick release pin," published on Sep. 7, 2004; and DE 10 2009 018 739 A1, having the title "Eating utensil e.g. potato fork, for use in fast food-sector, is designed such that utensil includes container or is equipped or mountable with container, where container is connected to cannula and medium is passed out from cannula tip," published on Sep. 30, 2010.

The present application relates to a container processing plant 1 comprising at least one format part 5, which can be separably connected by means of at least one connecting element 6 to a receiving element 7 or a format part of this kind. It is proposed that the connecting element 6 be designed as a locking pin 6, wherein a latch element 9 is provided on the retaining element 7, wherein the connecting element 6 reaches through the format part 5 and wherein the connecting element 6 can be separably connected by its connection end 10 to the latching element 9, and wherein the format part 5 can be fitted and removed parallel or substantially parallel to the vertical axis of the container processing plant 1.

One feature or aspect of an embodiment is believed at the time of the filing of this patent application to possibly reside broadly in a container processing plant having at least one format part 5 which can be separably connected via at least one connecting element 6 with a receiving element 7, wherein the connecting element 6 is designed as a locking pin 6, wherein a latching element 9 is provided on the receiving element 7, wherein the connecting element 6 reaches through the format part 5, and wherein the connecting element 6 can be separably connected with its connection end 10 to the latching element 9, and wherein the format part can be fitted and removed parallel or substantially parallel to the vertical axis of the container processing plant 1.

Another feature or aspect of an embodiment is believed at the time of the filing of this patent application to possibly reside broadly in the container processing plant, wherein the connecting element 6 has locking elements on its connection end 10, in the embodiment as locking balls or locking bolts.

Yet another feature or aspect of an embodiment is believed at the time of the filing of this patent application to possibly reside broadly in the container processing plant, wherein the format part 5 has at least one through hole for the connecting element 6.

Still another feature or aspect of an embodiment is believed at the time of the filing of this patent application to possibly reside broadly in the container processing plant, comprising a hollow body 16 through which the connecting element 6 extends.

A further feature or aspect of an embodiment is believed at the time of the filing of this patent application to possibly reside broadly in the container processing plant, wherein the format part 5 has components 17, 18 between which spacer elements 19 and/or hollow bodies 16 are arranged.

Another feature or aspect of an embodiment is believed at the time of the filing of this patent application to possibly reside broadly in the container processing plant, wherein the latching element 9 is designed as a sleeve, wherein the latching element 9 has a latching edge 20.

Yet another feature or aspect of an embodiment is believed at the time of the filing of this patent application to possibly reside broadly in the container processing plant, wherein the latching edge 20 is offset in height so as to form a stop on which a lower free end 23 of a hollow body 16 can rest.

Still another feature or aspect of an embodiment is believed at the time of the filing of this patent application to possibly reside broadly in the container processing plant, wherein at least one connecting element 6 has a compressed air supply and/or line and a pressure chamber, which is connected with the compressed air supply and/or line and in which a spring-loaded cylinder actively connected to the tappet 35 is mounted axially displaceably.

A further feature or aspect of an embodiment is believed at the time of the filing of this patent application to possibly reside broadly in the container processing plant, wherein at least one compressed air supply and/or line of a connecting element 6 is connected to a central actuating valve, or a group of compressed air supplies and/or lines of several connecting elements 6 is connected to a central actuating valve for pneumatic connection, in one possible embodiment unlocking.

Another feature or aspect of an embodiment is believed at the time of the filing of this patent application to possibly reside broadly in the container processing plant, wherein the actuating valve is arranged on the format part 5.

Yet another feature or aspect of an embodiment is believed at the time of the filing of this patent application to possibly reside broadly in the container processing plant, wherein the actuating valve can be connected to the central compressed air source via a connection, in one possible embodiment a fast coupling.

Still another feature or aspect of an embodiment is believed at the time of the filing of this patent application to possibly reside broadly in a format part 5 for a container processing plant having at least one connecting element 6 which can be separably connected with a receiving element 7, wherein the connecting element 6 is formed as a locking pin 6, wherein a latching element 9 is provided on the receiving element 7, wherein the connecting element 6 reaches through the format part 5, and wherein the connecting element 6 can be separably connected with its connecting end 10 to the latching element 9, and wherein the format part 5 can be fitted and removed parallel or substantially parallel to the vertical axis of the container processing plant 1.

A further feature or aspect of an embodiment is believed at the time of the filing of this patent application to possibly reside broadly in the format part, wherein the connecting element 6 has locking elements on its connection end 10 in the form of locking balls or locking bolts.

One feature or aspect of an embodiment is believed at the time of the filing of this patent application to possibly reside broadly in the format part, wherein this has at least one through hole for the connecting element 6.

Another feature or aspect of an embodiment is believed at the time of the filing of this patent application to possibly reside broadly in the format part, wherein at least one connecting element 6 has a compressed air supply and/or line and a pressure chamber, which is connected with the compressed air supply and/or line and in which a spring-loaded cylinder actively connected with the tappet 35 is mounted axially displaceably.

Yet another feature or aspect of an embodiment is believed at the time of the filing of this patent application to possibly reside broadly in the format part, wherein at least one compressed air supply and/or line of a connecting element 6 is connected to a central actuating valve, or a group of compressed air supplies and/or lines of several connecting elements 6 is connected to a central actuating valve for pneumatic actuation, in one possible embodiment unlocking.

Still feature or aspect of an embodiment is believed at the time of the filing of this patent application to possibly reside broadly in the format part, wherein the actuating valve is arranged on the format part 5.

The components disclosed in the patents, patent applications, patent publications, and other documents disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, patent applications, patent publications, and other documents either incorporated by reference or not incorporated by reference.

All of the patents, patent applications, patent publications, and other documents, except for the exceptions indicated herein, which were cited in the International Search Report Dec. 13, 2013, and/or cited elsewhere, as well as the International Search Report document itself, are hereby incorporated by reference as if set forth in their entirety herein except for the exceptions indicated herein, as follows: DE 44 36 201, having the title "Clamp for guiding bottles etc. through guide spiders, arcs etc," published on Apr. 18, 1996; GB 2 347 171, having the title "Pin locking assembly," published on Aug. 30, 2000; DE 10 2009 018731, having the title "Werkzeugloser Austausch von Flaschenführungskurven," published on Oct. 28, 2010; WO 2010/127700, having the title "CAPPING HEAD AND APPARATUS FOR THE CAPPING OF BOTTLES," published on Nov. 11, 2010; U.S. Pat. No. 3,596,554, having the title "SAFETY-TYPE LOCKING PIN," published on Aug. 3, 1971; U.S. Pat. No. 3,507,528, having the title "LOCKING DEVICE," published on Apr. 21, 1970; and EP 2 213 579, having the title "Holding device for at least one brush element and labelling machine," published on Aug. 4, 2010.

The corresponding foreign and international patent publication applications, namely, Federal Republic of Germany Patent Application No. 10 2012 108 953.1, filed on Sep. 21, 2012, having inventor Uwe WOLF, and DE-OS 10 2012 108 953.1 and DE-PS 10 2012 108 953.1, and International Application No. PCT/EP2013/002553, filed on Aug. 24, 2013, having WIPO Publication No. WO 2014/044351 and inventor Uwe WOLF, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications, patent publications, and other documents, except for the exceptions indicated herein, are hereby incorporated by reference as if set forth in their entirety herein except for the exceptions indicated herein.

The purpose of incorporating the corresponding foreign equivalent patent application(s), that is, PCT/EP2013/002553 and German Patent Application 10 2012 108 953.1, is solely for the purposes of providing a basis of correction of any wording in the pages of the present application, which may have been mistranslated or misinterpreted by the translator, and to provide additional information relating to technical features of one or more embodiments, which information may not be completely disclosed in the wording in the pages of this application.

Statements made in the original foreign patent applications PCT/EP2013/002553 and DE 10 2012 108 953.1 from which this patent application claims priority which do not have to do with the correction of the translation in this patent application are not to be included in this patent application in the incorporation by reference.

Any statements about admissions of prior art in the original foreign patent applications PCT/EP2013/002553 and DE 10 2012 108 953.1 are not to be included in this patent application in the incorporation by reference, since the laws relating to prior art in non-U.S. Patent Offices and courts may be substantially different from the Patent Laws of the U.S.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the embodiments therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, patent publications, and other documents, are not considered to be incorporated by reference herein for any of the patents, patent applications, patent publications, and other documents cited herein.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL LIST OF NOMENCLATURE

1 Container processing plant/machine
2 Worm conveyor
3 Container/bottles
4 Transport star
5 Format part
6 Connecting element/locking pin
7 Retaining element
8 Arrows
9 Latching element
10 Connection end of 6
11 Actuating end of 6
12 Locking balls
13 Actuating element/pushbutton
14 Hollow body
15 Actuation arrow for 13
16 Hollow body
17 Upper component of 5
18 Lower component of 5
19 Spacer element
20 Latching edge
21 Passage opening of 9
22 Stop
23 Free end of 16
24 Flange extension
25 Upper free end of 16
26 Removal arrows
27 Fitting arrows
28 Actuating mechanism
29 Spring
30 Spring seat
31 Contact element
32 Contact flange
33 Top
34 Bottom
35 Tappet
36 Active element
37 Blocking element
38 Conical region
39 Intermediate element

What is claimed is:

1. A rotary container processing machine comprising a format part configured to handle or guide bottles or similar containers, a receiving element disposed to support said format part, and at least one connecting element configured to detachably connect said format part to said receiving element, wherein:

said at least one connecting element comprises a locking pin configured and disposed to pass through said format part;

said receiving element comprises a latching element;

said locking pin comprises a connection end portion configured and disposed to engage with said latching element to detachably connect said format part to said receiving element;

said connection end portion comprises a body portion and locking elements disposed at least partially in said body portion;

said locking elements are movable with respect to said body portion to permit engagement and disengagement of said connection end portion and said latching element; and said format part is configured to be moved, upon connection to or disconnection from said receiving element, in a direction essentially parallel to the vertical rotational axis of the rotary container processing machine.

2. The rotary container processing machine according to claim 1, wherein said locking elements comprise locking balls or locking bolts.

3. The rotary container processing machine according to claim 2, wherein said format part comprises at least one hole configured to permit said locking pin to pass through said format part.

4. The rotary container processing machine according to claim 3, wherein said rotary container processing machine further comprises a hollow body through which at least said locking pin is disposed to extend.

5. The rotary container processing machine according to claim 4, wherein said format part comprises at least two separate components, and wherein:
said hollow body is disposed between said at least two separate components; and/or
said rotary container processing machine further comprises spacer elements disposed between said at least two separate components.

6. The rotary container processing machine according to claim 5, wherein said latching element is sleeve-shaped and comprises a stop portion.

7. The rotary container processing machine according to claim 6, wherein said stop portion projects inwardly to form a narrower space in said latching element configured to stop further movement of said hollow body through said latching element, and to permit said connection end portion of said locking pin to pass therethrough and thus further into said latching element than said hollow body.

8. The rotary container processing machine according to claim 7, wherein:
said at least one connecting element comprises a spring-loaded cylinder and a tappet disposed within said locking pin;
said spring-loaded cylinder is operatively connected to said tappet to axially displace said tappet to move said locking balls or locking bolts; and
said at least one connecting element comprises a pressure chamber configured to be pressurized and depressurized to actuate said spring-loaded cylinder.

9. The rotary container processing machine according to claim 8, wherein:
said at least one connecting element comprises a plurality of connecting elements; and
said rotary container processing machine comprises a supply of compressed air and a plurality of connecting lines to connect said supply of compressed air to said pressure chambers of each of said connecting elements.

10. The rotary container processing machine according to claim 9, wherein said rotary container processing machine comprises a central actuating valve configured to control the flow of compressed air through all of said connecting lines simultaneously.

11. The rotary container processing machine according to claim 9, wherein said rotary container processing machine comprises a plurality of actuating valves, one for each of said connecting lines, to control the flow of compressed air through each of said connecting lines individually or simultaneously.

12. The rotary container processing machine according to claim 11, wherein:
each of said actuating valves is mounted on said format part; or
each of said actuating valves is connected to said connecting lines, and comprises a fast coupling to permit quick connection and disconnection of said connecting lines to each of said pressure chambers of said connecting elements.

13. The rotary container processing machine according to claim 1, wherein:
said rotary container processing machine further comprises a hollow body through which at least said locking pin is disposed to extend;
said latching element is sleeve-shaped and comprises a stop portion disposed about an opening in said latching element;
said opening is sufficiently sized to permit said connection end portion to pass through and into said receiving element; and
said stop portion is of a similar diameter as said hollow body, such that an end surface of said hollow body abuts against said stop portion upon insertion of said connection end portion into said latching element.

14. The rotary container processing machine according to claim 13, wherein said latching element comprises a sleeve-shaped receiving portion disposed at and about said stop portion, which receiving portion is configured to receive therein an end portion of said hollow body to hold said end portion of said hollow body in place in said latching element.

15. The rotary container processing machine format part according to claim 13, wherein a substantial portion of said locking pin is disposed within said hollow body.

16. The rotary container processing machine format part according to claim 13, wherein:
said format part comprises a first component configured to handle a neck portion of a container, and a second component configured to handle a body portion of a container; and
said hollow body connects said first component to said second component such that, upon connection of said format part to said receiving element or disconnection of said format part from said receiving element, said hollow body, said first component, and said second component are all moved together as a single unit.

17. A rotary container processing machine format part configured to handle or guide bottles or similar containers, comprising at least one hollow body, and comprising at least one connecting element disposed to pass through said at least one hollow body and configured to detachably connect said format part to a receiving element configured to support said format part, wherein:
said at least one connecting element comprises a locking pin configured and disposed to pass through said format part and said at least one hollow body;
said locking pin comprises a connection end portion disposed to project out of said hollow body and configured to engage with a latching element of the receiving element to detachably connect said format part to the receiving element;
said connection end portion comprises a body portion and locking elements disposed at least partially in said body portion;
said locking elements are movable with respect to said body portion to permit engagement and disengagement of said connection end portion and the latching element; and
said format part is configured to be moved, upon connection to or disconnection from the receiving element, in a direction essentially parallel to a vertical rotational axis of a rotary container processing machine.

18. The rotary container processing machine format part according to claim 17, wherein:
said locking elements comprise locking balls or locking bolts;

said at least one connecting element comprises a spring-loaded cylinder and a tappet disposed within said locking pin; and said spring-loaded cylinder is operatively connected to said tappet to axially displace said tappet to move said locking balls or locking bolts.

19. The rotary container processing machine format part according to claim 18, wherein:

said at least one connecting element comprises a pressure chamber configured to be pressurized and depressurized to actuate said spring-loaded cylinder;

said at least one connecting element comprises a plurality of connecting elements;

said pressure chambers of each of said connecting elements are configured to be connected by connecting lines to a supply of compressed air; and said format part comprises a plurality of actuating valves to control the flow of compressed air to each of said pressure chambers individually or simultaneously.

20. The rotary container processing machine format part according to claim 17, wherein a substantial portion of said locking pin is disposed within said hollow body.

\* \* \* \* \*